US008880411B2

(12) United States Patent
Philippe et al.

(10) Patent No.: US 8,880,411 B2
(45) Date of Patent: Nov. 4, 2014

(54) CRITICAL SAMPLING ENCODING WITH A PREDICTIVE ENCODER

(75) Inventors: Pierrick Philippe, Melesse (FR); David Virette, Munich (DE)

(73) Assignee: Orange, Paris (FR)

( * ) Notice: Subject to any disclaimer, the term of this patent is extended or adjusted under 35 U.S.C. 154(b) by 778 days.

(21) Appl. No.: 13/120,473

(22) PCT Filed: Oct. 5, 2009

(86) PCT No.: PCT/FR2009/051888
§ 371 (c)(1), (2), (4) Date: Mar. 23, 2011

(87) PCT Pub. No.: WO2010/040937
PCT Pub. Date: Apr. 15, 2010

(65) Prior Publication Data

US 2011/0178809 A1 Jul. 21, 2011

(30) Foreign Application Priority Data

Oct. 8, 2008 (FR) ..................................... 08 56822

(51) Int. Cl.

| | |
|---|---|
| ***G10L 21/00*** | (2013.01) |
| ***G10L 19/022*** | (2013.01) |
| *H04R 5/00* | (2006.01) |
| *H04B 1/00* | (2006.01) |
| *G10L 19/02* | (2013.01) |
| *G10L 19/107* | (2013.01) |
| *G10L 19/20* | (2013.01) |
| *G10L 19/04* | (2013.01) |

(52) U.S. Cl.
CPC ........... *G10L 19/022* (2013.01); *G10L 19/0212* (2013.01); *G10L 19/107* (2013.01); *G10L 19/20* (2013.01); *G10L 19/04* (2013.01)
USPC ........... 704/500; 704/223; 704/201; 704/205; 704/220; 704/219; 381/23; 381/119

(58) Field of Classification Search
USPC ................. 704/500, 201, 223, 205, 220, 219; 381/23, 119
See application file for complete search history.

(56) References Cited

U.S. PATENT DOCUMENTS 6,134,518 A * 10/2000 Cohen et al. .................. 704/201
6,785,645 B2 * 8/2004 Khalil et al. .................. 704/216
7,493,256 B2 * 2/2009 Huang .......................... 704/223

(Continued)

FOREIGN PATENT DOCUMENTS

EP 0 932 141 A2 7/1999
EP 1 278 184 A2 1/2003

(Continued)

OTHER PUBLICATIONS

Bessette et al., "Universal Speech/Audio Coding Using Hybrid ACELP/TCX Techniques," 2005 IEEE International Conference on Acoustics, Speech, and Signal Processing, Piscataway, NJ, USA, IEEE, vol. 3, pp. 301-304 (Mar. 18, 2005).

*Primary Examiner* — Paras D Shah
*Assistant Examiner* — Neeraj Sharma
(74) *Attorney, Agent, or Firm* — Drinker Biddle & Reath LLP

(57) ABSTRACT

A method for encoding and decoding a digital audio signal is provided, said method comprising the steps of: encoding a first sequence of samples of the digital signal according to a transform encoding; encoding a second sequence of samples of the digital signal according to a predictive encoding; wherein the second sequence starts before the end of the first sequence, a subsequence common to the first and second sequences being thus encoded both by predictive encoding and by transform encoding.

15 Claims, 8 Drawing Sheets

(56) References Cited

U.S. PATENT DOCUMENTS

| | | | | |
|---|---|---|---|---|
| 7,751,572 | B2 * | 7/2010 | Villemoes et al. | 381/23 |
| 7,792,679 | B2 * | 9/2010 | Virette et al. | 704/500 |
| 8,069,034 | B2 * | 11/2011 | Makinen et al. | 704/201 |
| 8,352,258 | B2 * | 1/2013 | Yamanashi et al. | 704/230 |
| 2001/0023396 | A1 * | 9/2001 | Gersho et al. | 704/220 |
| 2003/0004711 | A1 * | 1/2003 | Koishida et al. | 704/223 |
| 2003/0220800 | A1 * | 11/2003 | Budnikov | 704/500 |
| 2006/0106597 | A1 * | 5/2006 | Stein | 704/203 |
| 2006/0247928 | A1 * | 11/2006 | Cowdery | 704/229 |
| 2007/0282603 | A1 * | 12/2007 | Bessette | 704/219 |
| 2007/0297624 | A1 * | 12/2007 | Gilman | 381/119 |
| 2008/0091438 | A1 * | 4/2008 | Masuda et al. | 704/500 |
| 2010/0138218 | A1 * | 6/2010 | Geiger | 704/205 |

FOREIGN PATENT DOCUMENTS

| | | | |
|---|---|---|---|
| WO | WO 2005/114654 | A1 | 12/2005 |
| WO | WO 2008/089705 | A1 | 7/2008 |

* cited by examiner

CRITICAL SAMPLING ENCODING WITH A PREDICTIVE ENCODER

CROSS-REFERENCE TO RELATED APPLICATIONS

This application is the U.S. national phase of the International Patent Application No. PCT/FR2009/051888 filed Oct. 5, 2009, which claims the benefit of French Application No. 08 56822 filed Oct. 8, 2008, the entire content of which is incorporated herein by reference.

FIELD OF THE INVENTION

The present invention relates to the field of the coding of digital signals.

The invention applies advantageously to the coding of sounds exhibiting alternations of speech and of music.

BACKGROUND

To effectively code speech sounds, CELP ("Code Excited Linear Prediction") type techniques are advocated. On the other hand, to effectively code musical sounds, transform coding techniques are advocated.

Coders of CELP type are predictive coders. Their aim is to model the production of speech on the basis of various elements: a long-term prediction for modeling the vibration of the vocal chords in a voiced period, a stochastic excitation (white noise, algebraic excitation), and a short-term prediction for modeling the modifications of the vocal tract.

Transform coders use critical sampling transforms to compact the signal in the transformed domain. A transform for which the number of coefficients in the transformed domain is equal to the number of coefficients of the digitized sound is called a "critical sampling transform".

One solution for effectively coding a signal containing these two types of content consists in selecting in the course of time the best technique. This solution has in particular been advocated by the 3GPP ("3rd Generation Partnership Project") standardization body, and a technique named AMR WB+ has been proposed.

This technique is based on a CELP technology of AMR WB type and a transformation coding based on an overlap Fourier transform.

This solution suffers from inadequate quality in the music. This inadequacy stems particularly from the transform coding. Indeed, the overlap Fourier transform is not a critical sampling transformation, and therefore, it is sub-optimal.

Moreover, the windows used in this coder are not optimal in regard to energy concentration: the frequency forms of these windows are relatively frozen.

Critical sampling transformations are known. For example, the transforms used in the music coders of MP3 and AAC type. These transforms rely on the formalism called TDAC ("Time Domain Aliasing Cancellation").

The use of TDAC makes it possible to obtain excellent quality in the music. Nonetheless, this has the drawback of introducing temporal aliasings which hinder combination with technologies of CELP type.

Indeed, during a transition of TDAC to CELP type the temporal aliasing of the TDAC part is not canceled by the signal arising from the CELP, the latter not incorporating any aliasing.

SUMMARY

An object of the present invention is to propose a technique making it possible to reconstruct an audio signal, with good quality, by alternating transform coding techniques (for example employing critical sampling) and predictive coding techniques (for example of CELP type).

For this purpose, the present invention proposes a method for coding a digital signal, comprising the steps:

- coding a first sequence of samples of the digital signal according to a transform coding;
- coding a second sequence of samples of the digital signal according to a predictive coding;

and in which the second sequence begins before the end of the first sequence, a sub-sequence common to the first and second sequences thus being coded at one and the same time by predictive coding and by transform coding.

Thus, during the decoding of the digital audio signal, the aliasing created by the coding in the sub-sequence of the first sequence may be eliminated by means of samples of this sub-sequence arising from the decoding of the sub-sequence within the second sequence. Moreover, the second sequence may be decoded since the past samples, useful for the predictive decoding, do not comprise this aliasing.

Advantageously the transform coding is a critical sampling transform coding.

For example, the transform coding is a transform coding of TDAC type.

For example, the predictive coding is a coding of CELP type.

In an advantageous implementation, the transform coding of the first sequence comprises the application of an analysis window making it possible to deduce from a perfect reconstruction relation for the digital signal a synthesis window comprising at least three parts:

- a first nominal part,
- a second substantially zero terminal part,
- a third substantially continuous intermediate part between the first and second parts.

There is then provision that at least the parts of the analysis window making it possible to deduce respectively the second and third parts of the synthesis window are applied to the sub-sequence common to the two sequences.

The expression "substantially continuous" is understood to mean the fact that the third part makes it possible not to have any discontinuity between the first and second parts. Indeed, this type of discontinuity reduces the decoding quality by adding decoding noise.

The perfect reconstruction relation imposes a relation between the forms of the analysis and synthesis windows. Furthermore, when switching between a transform coding and a predictive coding, it is possible to describe the analysis window or the synthesis window in an equivalent manner. Indeed, in this case, the reconstruction relation causes the appearance of a direct relation between the two forms.

With an analysis window (and therefore a synthesis window) thus chosen, it is possible to reduce the zone in which the aliasing appears on decoding the first sequence.

With the window thus defined, it is possible to reduce the number of samples of the second sequence (predictive coding) to be transmitted for the decoding.

Furthermore, the additional number of samples is related to the size of the intermediate part.

For example, the intermediate part is a sine arch. For example again, the intermediate part is a "Kaiser-Bessel" derived function. Furthermore, it may arise from a window optimization calculation and not have any explicit expression.

For example, the synthesis window is an asymmetric window.

Thus, it is possible to adapt the profile of the synthesis window (therefore the analysis window) to the coding of the sequence following or preceding the first sequence.

In an advantageous implementation, the synthesis window furthermore comprises a fourth initial part which is continuous between a substantially zero value and a nonzero value of the first part.

Thus, it is possible to minimize the impact of the transition between transform coding and predictive coding on the transform coding.

For example, the fourth part of the synthesis window is a gentle transition between an initial value and a value of the nominal part, and the third part is an abrupt transition between a value of the nominal part and a value of the substantially zero part.

This yields a better concentration of the energy of the signal in the frequency domain for better effectiveness of coding of the transformed part.

Provision may be made for the first and second sequences to belong to one and the same frame of the digital signal.

Thus, it is possible to use the coding of the first sequence as a transition coding after the coding of a frame by transform coding. This makes it possible to improve the effectiveness of the coding by not disturbing this frame.

The present invention also provides a method for decoding a digital signal, comprising the steps:

- receiving a transform vector coding a first sequence of samples of the digital signal according to a transform coding;
- receiving a prediction vector coding a second sequence of samples of the digital signal according to a predictive coding;

in which the second sequence begins before the end of the first sequence, a sub-sequence common to the first and second sequences thus being received coded at one and the same time by predictive coding and by transform coding; and which furthermore comprises the steps:

- a) applying to the transform vector a transform inverse to the transform coding so as to decode a sub-sequence of the first sequence not coded by predictive coding;
- b) decoding at least in the prediction vector the sub-sequence common to the first and second sequences at least by a predictive decoding, based on at least one sample arising from step a);
- c) decoding in the predictive vector by a predictive decoding a sub-sequence of the second sequence not coded by transform coding, based on at least one sample arising from one of steps a) and b).

Thus, it is possible to eliminate the aliasing present in the decoded sub-sequence by using samples decoded by predictive decoding.

In an advantageous implementation, step b) comprises the sub-steps:

- b1) decoding in the predictive vector the sub-sequence common to the first and second sequences by a predictive decoding, based on at least one sample arising from step a);
- b2) applying to the transform vector a transform inverse to the transform coding so as to decode the sub-sequence common to the first and second sequences; and
- b3) decoding the sub-sequence common to the first and second sequences by combining at least one sample arising from step b1) with a corresponding sample arising from step b2).

For example, the combination is a linear combination. By thus combining the samples, a more robust decoding is obtained.

In another advantageous implementation, step b) comprises the sub-steps:

- b4) decoding in the predictive vector the sub-sequence common to the first and second sequences by a predictive decoding, based on at least one sample arising from step a);
- b5) creating on the basis of at least one sample arising from step b4) a sample containing an aliasing equivalent to a transform coding followed by a transform decoding;
- b6) applying to the transform vector a transform inverse to the transform coding so as to decode the sub-sequence common to the first and second sequences; and
- b7) decoding the sub-sequence common to the first and second sequences by combining at least one sample arising from step b5) with a corresponding sample arising from step b6).

Thus, the aliasing created by step b5) corresponds exactly to the aliasing present in the decoded sub-sequence.

The creation of the aliasing can be done by applying a matrix representing direct and inverse transformation operations. Such a matrix may be equivalent to the application of a transform coding followed immediately by a transform decoding.

Of course, it is possible to use one and the same predictive coding for all the samples.

Likewise, it is possible to use the same transform coding/decoding, with the same analysis and synthesis windows, each time that such a coding/decoding is performed.

In one implementation, step a) comprises the application of a synthesis window comprising at least three parts:

- a first nominal part,
- a second substantially zero terminal part,
- a third continuous intermediate part between the first and second zones, and at least the second and third parts are applied to samples coding the sub-sequence common to the two sequences.

The present invention provides a computer program comprising instructions for the implementation of the coding method such as described, when the program is executed by a processor.

Moreover, the present invention is aimed at a medium readable by a computer on which such a computer program is recorded.

The present invention also provides a computer program comprising instructions for the implementation of the decoding method such as described, when the program is executed by a processor.

Moreover, the present invention is aimed at a medium readable by a computer on which such a computer program is recorded.

The present invention provides a coding entity adapted for implementing the coding method such as described.

Such a coding entity for a digital audio signal can comprise:

- a transform coder for coding a first sequence of samples of the digital audio signal according to a transform coding;
- a predictive coder for coding a second sequence of samples of the digital audio signal according to a predictive coding;

there is provision for the second sequence to begin before the end of the first sequence, a sub-sequence common to the first and second sequences thus being coded at one and the same time by predictive coding and by transform coding.

The present invention provides a decoding entity adapted for implementing the decoding method such as described.

Provision may be made for a digital signal decoding entity, comprising means of reception:

of a transform vector coding a first sequence of samples of the digital signal according to a transform coding; and of a prediction vector coding a second sequence of samples of the digital signal according to a predictive coding;

in which the second sequence begins before the end of the first sequence, a sub-sequence common to the first and second sequences thus being coded at one and the same time by predictive coding and by transform coding; and which furthermore comprises:

a first decoder for applying to the transform vector a transform inverse to the transform coding so as to decode a sub-sequence of the first sequence not coded by predictive coding;

a second decoder for decoding at least in the predictive vector the sub-sequence common to the first and second sequences at least by a predictive decoding, based on at least one sample arising from the first transform decoder; and a third predictive decoder for decoding in the predictive vector by a predictive decoding a sub-sequence of the second sequence not coded by transform coding, based on at least one sample arising from one of the first and second decoders.

In an advantageous implementation, the second decoder comprises:

first means for decoding in the predictive vector the sub-sequence common to the first and second sequences by a predictive decoding, based on at least one sample arising from the first transform decoder;

second means for applying to the transform vector a transform inverse to the transform coding so as to decode the sub-sequence common to the first and second sequences; and third means for decoding the sub-sequence common to the first and second sequences by combining at least one sample arising from the first means with a corresponding sample arising from the second means.

In another advantageous implementation, the second decoder comprises:

first means for decoding in the predictive vector the sub-sequence common to the first and second sequences by a predictive decoding, based on at least one sample arising from the first transform decoder;

fourth means for creating on the basis of at least one sample restored by the first means a sample containing an aliasing equivalent to a transform coding followed by a transform decoding;

fifth means for applying to the transform vector a transform inverse to the transform coding so as to decode the sub-sequence common to the first and second sequences; and sixth means for decoding the sub-sequence common to the first and second sequences by combining at least one sample arising from the fourth means with a corresponding sample arising from the fifth means.

Of course, all the means carrying out one and the same type of coding or decoding (predictive or transform-based) may be united in one and the same unit.

Likewise, it is possible to provide a single unit (for coding or decoding) to carry out a predictive and transform-based coding or decoding, respectively.

Of course, the coders/decoders described can comprise a signal processor, storage elements, as well as means of communication between these elements.

The present invention therefore makes it possible to alternate transformation-based coding techniques, for example employing critical sampling of TDAC type, and predictive coding techniques, for example of CELP type over time so as to obtain good reconstruction quality.

For this purpose the invention proposes particular temporal relations between the two types of coding: the temporal position of the CELP frames and transform being shifted temporally.

In advantageous implementations, the invention also proposes to elongate the duration of the frames, or of the sequences covered by the CELP coding, by an overlap, during a transition from transform to CELP. This duration may be variable over time if the transform requires good frequency concentration.

The duration of use of the CELP coding may be variable from one frame to another, so as to rapidly adapt the coding technique to the changes in the nature of the sounds.

According to an advantage of the present invention, a frame of M samples may be subdivided into several subframes mingling CELP-encoded portions and others in the transformed domain.

The invention finds its application in sound coding systems, in particular in standardized speech coders, in particular to ITU ("International Telecommunication Union") or ISO ("International Standard Organization") standards, for coding generic sounds, including speech signals.

BRIEF DESCRIPTION OF THE DRAWINGS

Other characteristics and advantages of the invention will be apparent on examining the detailed description hereinafter, and the appended figures among which.

DETAILED DESCRIPTION

Figure 1:
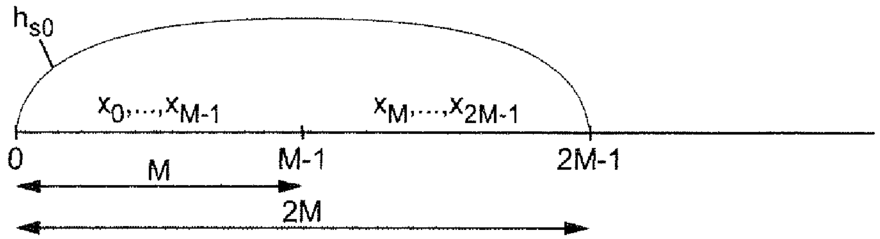
FIG. 1 illustrates two synthesis windows of a transform coding.

Hereinafter, we begin by describing a perfect reconstruction TDAC transformation, and then we present a technique making it possible to render it compatible with a critical sampling. Finally, we describe a CELP coding and a combination of this coding with the TDAC coding.

TDAC and Perfect Reconstruction

We consider a sound signal digitized according to a sampling period $$\frac{1}{F_e}$$

($F_e$ being the sampling frequency). For a given frame of index t, the samples are denoted by $x_{n+tM}$ for each instant n+tM.

The expression for the TDAC transform on coding the frame is presented hereinbelow:

$$X_{t,k} = \sum_{n=0}^{2M-1} x_{n+tM}\, p_k(n) \quad 0 \le k < M,$$

M represents the size of the transform, $X_{t,k}$ are the samples in the transformed domain for the frame t, $$p_k(n) = h_a(n)C_{n,k} = \sqrt{\frac{2}{M}}\, h_a(n)\cos\left[\frac{\pi}{4M}(2n+1+M)(2k+1)\right]$$

is a basis function of the transform wherein:

the term $h_a(n)$ is called a prototype filter or "analysis weighting window" and covers 2M samples, and wherein the term $C_{n,k}$ defines the modulation.

To restore the initial temporal samples, the following inverse transformation, on decoding, is applied so as to reconstitute the samples 0≤n<M which are then situated in a zone of overlap of two consecutive transforms. The decoded samples are then given by:

$$\hat{x}_{n+tM+M} = \sum_{k=0}^{M-1} [X_{t+1,k}\, p_k^s(n) + X_{t,k}\, p_k^s(n+M)],$$

where $p_k^s(n)=h_s(n)C_{n,k}$ defines the synthesis transform, the synthesis weighting window being denoted by $h_s(n)$ and also covering 2M samples.

The reconstruction equation giving the decoded samples can also be written in the following form:

$$\begin{aligned}\hat{x}_{n+tM+M} &= \sum_{k=0}^{M-1} [X_{t+1,k}\, h_s(n)C_{k,n} + X_{t,k}\, h_s(n+M)C_{k,n+M}] \\ &= h_s(n)\sum_{k=0}^{M-1} X_{t+1,k}\, C_{k,n} + h_s(n+M)\sum_{k=0}^{M-1} X_{t,k}\, C_{k,n+M}\end{aligned}$$

This other presentation of the reconstruction equation amounts to considering that two inverse cosine transforms may be performed successively on the samples in the transformed domain $X_{t,k}$ and $X_{t+1,k}$, their result being combined thereafter by a weighting and addition operation.

It is the addition of two consecutive frames which makes it possible to eliminate the so-called aliased components of the transformation. Indeed if the direct and inverse transformation operations are written in matrix form for the frames t=0 and t=1 we have:

$$\begin{bmatrix} X_{0,0} \\ X_{0,1} \\ \vdots \\ X_{0,M-1} \end{bmatrix} = \begin{bmatrix} C_{0,0} & C_{0,1} & \dots & C_{0,2M-1} \\ C_{1,0} & C_{1,1} & \dots & C_{1,2M-1} \\ \vdots & \vdots & \ddots & \vdots \\ C_{M-1,0} & C_{M-1,1} & \dots & C_{M-1,2M-1} \end{bmatrix} \cdot \begin{bmatrix} h_{a0}(0) & 0 & \dots & 0 \\ 0 & h_{a0}(1) & \dots & 0 \\ \vdots & \vdots & \ddots & \vdots \\ 0 & 0 & \dots & h_{a0}(2M-1) \end{bmatrix} \cdot \begin{bmatrix} x_0 \\ x_1 \\ \vdots \\ x_{2M-1} \end{bmatrix}$$

$$\begin{bmatrix} X_{1,0} \\ X_{1,1} \\ \vdots \\ X_{1,M-1} \end{bmatrix} = \begin{bmatrix} C_{0,0} & C_{0,1} & \dots & C_{0,2M-1} \\ C_{1,0} & C_{1,1} & \dots & C_{1,2M-1} \\ \vdots & \vdots & \ddots & \vdots \\ C_{M-1,0} & C_{M-1,1} & \dots & C_{M-1,2M-1} \end{bmatrix} \cdot \begin{bmatrix} h_{a1}(0) & 0 & \dots & 0 \\ 0 & h_{a1}(1) & \dots & 0 \\ \vdots & \vdots & \ddots & \vdots \\ 0 & 0 & \dots & h_{a1}(2M-1) \end{bmatrix} \cdot \begin{bmatrix} x_M \\ x_{M+1} \\ \vdots \\ x_{3M-1} \end{bmatrix}$$

Upon synthesis, we obtain:

$$\begin{bmatrix} \tilde{x}_{0,0} \\ \tilde{x}_{0,0} \\ \vdots \\ \tilde{x}_{0,2M-1} \end{bmatrix} = \begin{bmatrix} h_{s0}(0) & 0 & \dots & 0 \\ 0 & h_{s0}(1) & \dots & 0 \\ \vdots & \vdots & \ddots & \vdots \\ 0 & 0 & \dots & h_{s0}(2M-1) \end{bmatrix} \cdot \begin{bmatrix} C_{0,0} & C_{1,0} & \dots & C_{M-1,0} \\ C_{0,1} & C_{1,1} & \dots & C_{M-1,1} \\ \vdots & \vdots & \ddots & \vdots \\ C_{0,2M-1} & C_{1,2M-1} & \dots & C_{2M-1,M-1} \end{bmatrix} \cdot \begin{bmatrix} X_{0,0} \\ X_{0,1} \\ \vdots \\ X_{0,M-1} \end{bmatrix}$$

$$\begin{bmatrix} \tilde{x}_{0,0} \\ \tilde{x}_{0,0} \\ \vdots \\ \tilde{x}_{0,2M-1} \end{bmatrix} = \begin{bmatrix} h_{s0}(0) & 0 & \dots & 0 \\ 0 & h_{s0}(1) & \dots & 0 \\ \vdots & \vdots & \ddots & \vdots \\ 0 & 0 & \dots & h_{s0}(2M-1) \end{bmatrix} \cdot S \cdot \begin{bmatrix} h_{a0}(0) & 0 & \dots & 0 \\ 0 & h_{a0}(1) & \dots & 0 \\ \vdots & \vdots & \ddots & \vdots \\ 0 & 0 & \dots & h_{a0}(2M-1) \end{bmatrix} \cdot \begin{bmatrix} x_0 \\ x_1 \\ \vdots \\ x_{2M-1} \end{bmatrix}$$

-continued

With $$S=\begin{bmatrix} C_{0,0} & C_{1,0} & \cdots & C_{M-1,0} \\ C_{0,1} & C_{1,1} & \cdots & C_{M-1,1} \\ \vdots & \vdots & \ddots & \vdots \\ C_{0,2M-1} & C_{1,2M-1} & \cdots & C_{2M-1,M-1} \end{bmatrix} \cdot \begin{bmatrix} C_{0,0} & C_{0,1} & \cdots & C_{0,2M-1} \\ C_{1,0} & C_{1,1} & \cdots & C_{1,2M-1} \\ \vdots & \vdots & \ddots & \vdots \\ C_{M-1,0} & C_{M-1,1} & \cdots & C_{M-1,2M-1} \end{bmatrix}$$

$$S=\begin{bmatrix} I_M - J_M & 0_M \\ 0_M & I_M + J_M \end{bmatrix}$$

$I_M$ being the identity square matrix of size M, $J_M$ being the anti-identity square matrix of size M, which to a series of values of increasing indices, returns the same series of values with the indices decreasing, $0_M$ is a square matrix of size M containing only zeros.

Thus, it follows that:

$$\begin{cases} \tilde{x}_{0,n} = h_{s0,n}[h_{a0,n}x_n - h_{a0,M-1-n}x_{M-1-n}] \\ \tilde{x}_{0,M+n} = h_{s0,M+n}[h_{a0,M+n}x_{M+n} + h_{a0,2M-1-n}x_{2M-1-n}], \end{cases}$$

and by analogy by using the frame t=1:

$$\begin{cases} \tilde{x}_{1,n} = h_{s1,n}[h_{a1,n}x_{M+n} - h_{a1,M-1-n}x_{2M-1-n}] \\ \tilde{x}_{1,M+n} = h_{s1,M+n}[h_{a1,M+n}x_{2M+n} + h_{a1,2M-1-n}x_{3M-1-n}]. \end{cases}$$

Thus, if $\tilde{x}_{0,M+n}$ and $\tilde{x}_{1,n}$ are added together term by term we obtain:

$$\hat{x}_{M+n}=\tilde{x}_{0,M+n}+\tilde{x}_{1,n}=h_{s0,M+n}[h_{a0,M+n}x_{M+n}+h_{a0,2M-1-n}x_{2M-1-n}]+h_{s1,n}[h_{s1,n}[h_{a1,n}x_{M+n}-h_{a1,M-1-n}x_{2M-1-n}]$$

$$\hat{x}_{M+n}=\tilde{x}_{0,M+n}+\tilde{x}_{1,n}=x_{M+n}[h_{a0,M+n}h_{s0,M+n}+h_{a1,n}h_{s1,n}]+x_{2M-1-n}[h_{a0,2M-1-n}h_{s0,M+n}-h_{a1,M-1-n}h_{s1,n}]$$

If one wishes to ensure $\hat{x}_{M+n}=x_{M+n}$ and thus obtain perfect reconstruction, the following necessary conditions in the analysis and synthesis filters are obtained:

$$\begin{cases} h_{a0,M+n}h_{s0,M+n} + h_{a1,n}h_{s1,n} = 1 \\ h_{a0,2M-1-n}h_{s0,M+n} - h_{a1,M-1-n}h_{s1,n} = 0, \end{cases}$$

that is to say $$\begin{cases} h_{a1}(M-1-n) = D(n)h_{s0}(n+M) \\ h_{a0}(2M-1-n) = D(n)h_{s1}(n), \end{cases}$$

with $$D(n) = h_{a0}(n+M)\cdot h_{a1}(M-1-n) + h_{a1}(n)\cdot h_{a0}(2M-1-n).$$

It is apparent that to ensure perfect reconstruction, the analysis and synthesis forms are constructed by time reversal and weighting. Consequently, if $h_s$ contains zeros at n, then $h_a$ will contain them in the symmetric part around M/2, that is to say at the index M−1−n.

The synthesis is illustrated by an example in FIG. 1. In this example, two inverse transforms of size M $h_{s0}$ and $h_{s1}$ are made to follow one another.

To reconstruct the samples between M and 2M−1 the samples covered by the common part between $h_{s0}$ and $h_{s1}$ are added together. The reconstruction will be perfect if the windows satisfy the above-stated conditions of perfect reconstruction.

The usual case of reconstruction therefore occurs when two consecutive spectra, for example $X_t$ and $X_{t+1}$, arising from direct transformations are received in a decoder and when the inverse transformations are applied to them to obtain $\tilde{x}_0$ and $\tilde{x}_1$ respectively. The original signal will be perfectly reconstructed by adding together the last M samples of the first set and the first M of the second.

It is also possible to consider that $X_t$ alone has been transmitted. Perfect reconstruction may be obtained if one knows how to construct the signal $\tilde{x}_{1,n}$. This will be possible if the samples $x_M$ to $x_{2M-1}$ are known. In this way it will be possible, by weighting by the windows $h_{s1}$ and $h_{a1}$, to construct the vector making it possible to eliminate the aliasing emanating from the vector $\tilde{x}_0$.

In the foregoing, it was considered that the signals $X_t$ and $x_M$ to $x_{2M-1}$ were available.

If now it is considered that the following frame is transmitted in the frequency domain ($X_{t+2}$), the aliasing situated between $x_{2M}$ to $x_{3M-1}$ is not eliminated. Accordingly, it would have been necessary to receive these samples beforehand. Nonetheless, this trivial solution is sub-optimal from the critical sampling point of view.

Hereinafter, a means of alleviating this drawback is presented.

Effective Temporal Coding

It is proposed that particular windows be chosen which make it possible to transmit the temporal-coded signal when desired without however losing the critical sampling (that is to say the same number of transmitted and reconstructed samples). This is what is illustrated in FIG. 2.

Figure 2:
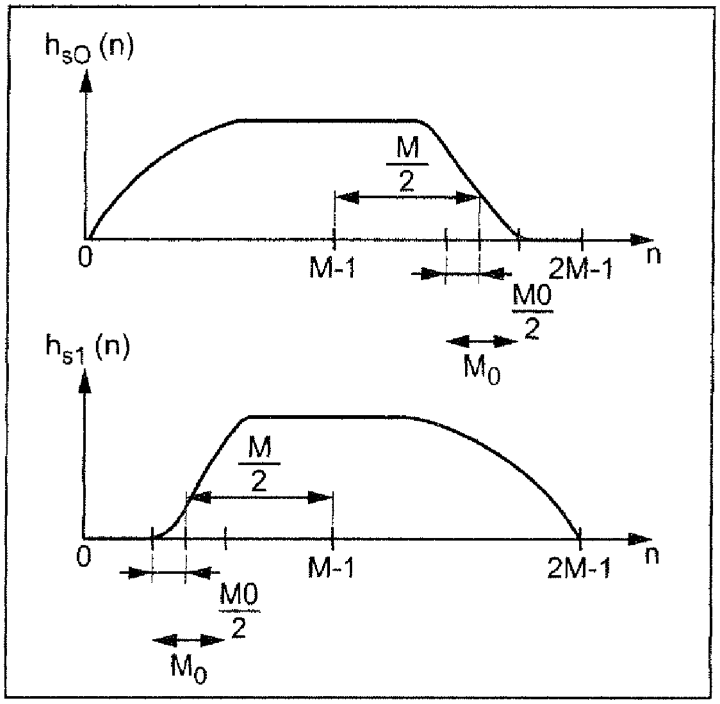
FIG. 2 illustrates synthesis windows of an implementation of the invention.

By construction, as illustrated in FIG. 2, we choose:

hs0=0 for n lying between M+(M+Mo)/2 and 2M−1, and hs1=0 for n lying between 0 and (M−Mo)/2, with $M_o$ a given integer value lying between 1 and M−1.

For example, the descending and ascending portions of hs0 and hs1 around the sample M+M/2 consist of sine arches given by the equation:

$$h_{s1}(n)=\sin(\mathrm{pi}*(0.5+n-((M-Mo)/2))/2/Mo) \text{ for n lying between } (M-Mo)/2 \text{ and } (M+Mo)/2.$$

$h_{s0}(n)$ will be taken as symmetric in this zone of $h_{s1}$ to obtain perfect reconstruction.

$h_{s1}$ may be defined likewise by a “Kaiser Bessel” derived function used for example in coders of AAC type.

Thus defined, the forms of $h_{s0}$ and $h_{s1}$ make it possible to ensure perfect reconstruction.

Figure 3:
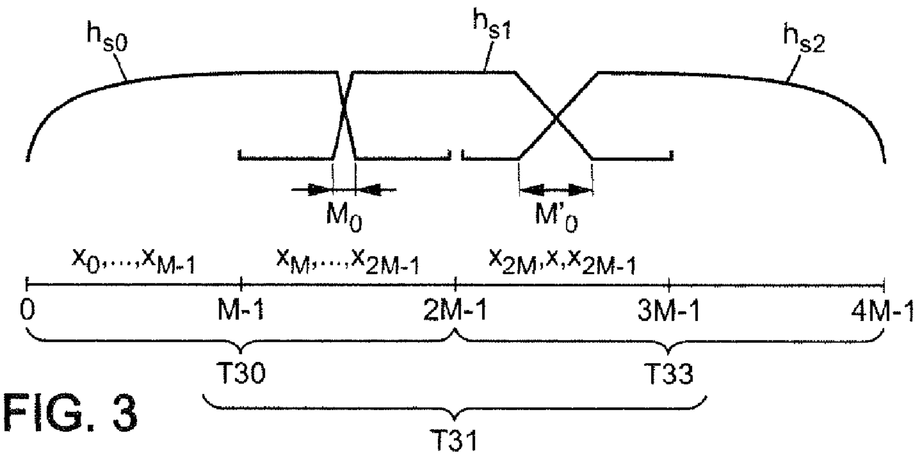
FIG. 3 illustrates data frames processed by synthesis windows.

As illustrated in FIG. 3, a first frame T30 (windowed by $h_{s0}$) combined with frame T31 (windowed by hs1) makes it possible to reconstruct the segment from M to 2M−1, frames T31 and T33 making it possible to obtain samples 2M to 3M−1 etc.

In the case where the signal of frame T31 is transmitted frequency-wise, the critical sampling is adhered to and reconstruction is perfect insofar as the analysis and synthesis filters satisfy the necessary condition.

In so far as sample $x_{3M/2+n}$ (n<Mo/2) is transmitted in frame T31 then sample $x_{3M/2-1-n}$ may be generated based on the knowledge of $\tilde{x}_{0,M+M/2+n}$ arising from frame T30. This will be based on the relation:

$$\tilde{x}_{0,M+n}=h_{s0,M+n}[h_{a0,M+n}x_{M+n}+h_{a0,2M-1-n}x_{2M-1-n}] \text{ for } n=M/2.$$

We will then have:

$$x_{3M/2-1-n}=\frac{1}{h_{a0,3M/2-1-n}}\left[\frac{\tilde{x}_{0,3M/2+n}}{h_{s0,3M/2+n}}-h_{a0,3M/2+n}x_{3M/2+n}\right].$$

This may be repeated so as to retrieve the samples in the overlap zone, that is to say between the samples (M−Mo)/2 and M/2.

By using the relations determined beforehand:

$$\begin{cases} h_{a1}(M-1-n)=D(n)h_{s0}(n+M) \\ h_{a0}(2M-1-n)=D(n)h_{s1}(n). \end{cases}$$

Because $h_{s0}$ contains zeros between $M+(M+M_o)/2$ and 2M−1, $h_{a1}$ contains zeros between 0 and $(M-M_o)/2$.

Likewise, because $h_{s1}$ contains only zeros between 0 and (M−Mo)/2, $h_{a0}$ contains only zeros between M+(M+Mo)/2 and 2M−1.

hs0=0 for n=M+(M+Mo)/2 . . . 2M−1, hs1=0 for n=0 . . . (M−Mo)/2, ha1=0 for n=0 . . . (M−Mo)/2, ha0=0 for n=M+(M+Mo)/2 and 2M−1.

Figure 4:
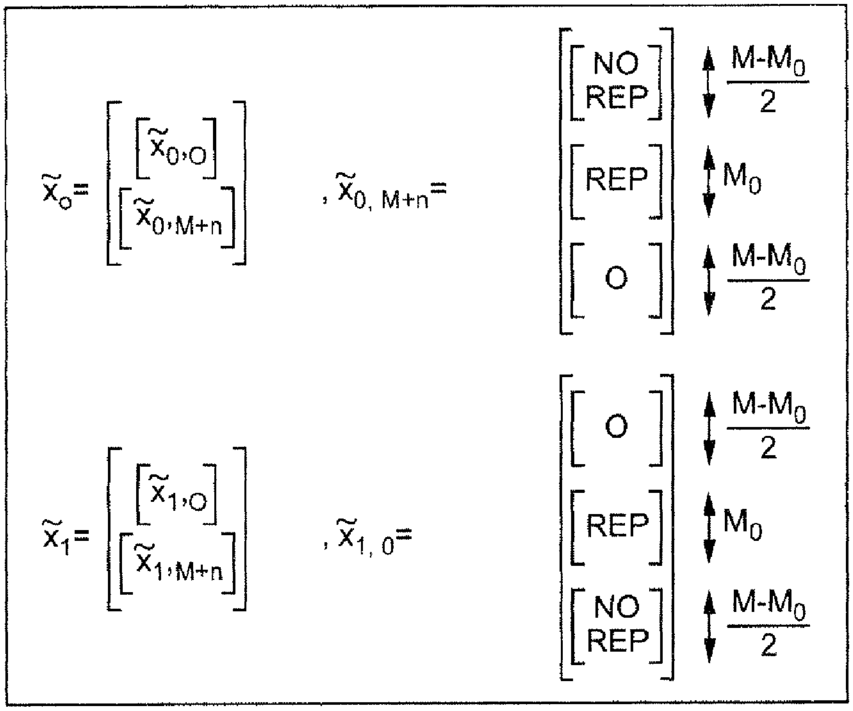
FIG. 4 illustrates vectors of samples obtained by applying the synthesis windows.

Consequently, as illustrated in FIG. 4, the vector $\tilde{x}_{0,M+n}$ contains 3 zones:

- $\tilde{x}_{0,M+n}$=0 of n=(M+Mo)/2 . . . M−1,
- $\tilde{x}_{0,M+n}$ does not contain any aliased components between n=0 and n=(M−Mo)/2, and
- the central zone around M+M/2 for which aliased components exist.

Likewise:

- $\tilde{x}_{1,n}$=0 between n=0 and n=(M−Mo)/2,
- $\tilde{x}_{1,n}$ does not contain any aliasing components between (M+Mo)/2 and M−1, and
- the central zone around M/2 for which aliased components exist.

By virtue of these properties, it is therefore possible to recover the segment $x_M \ldots x_{2M-1}$ while ensuring perfect reconstruction.

This perfect reconstruction may be obtained:

- by transmission in the transformed domain of the vector $X_1$,
- by transmission in the temporal domain of the samples $x_{3M/2} \ldots x_{5M/2-1}$ According to the foregoing, it is now possible to carry out a critical sampling TDAC coding while avoiding the problems related to aliasing. Hereinafter is described a CELP coding, allowing advantageous combination with the TDAC coding described previously.

TDAC+CELP

It is recalled that the framework adopted is that of operation of the type presented in the AMR WB+ specification. A coding of transformed type using TDAC is alternated with a coding of temporal type which consists of a CELP coder (for example according to the AMR WB recommendation).

Figure 5:
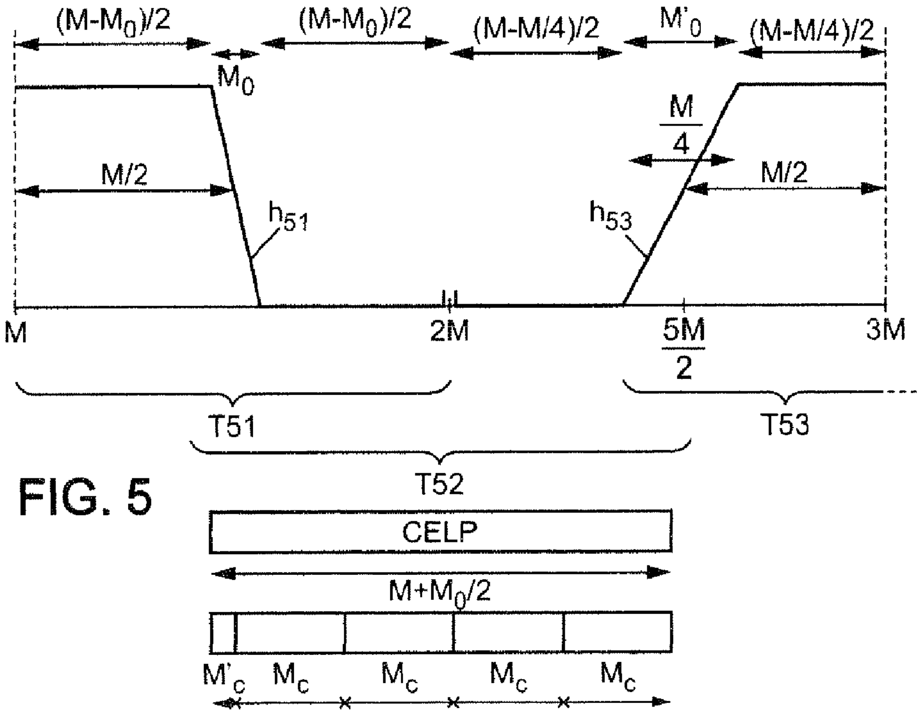
FIG. 5 illustrates the case of a TDAC coding followed by an AMR WB coding, and then followed by a TDAC coding according to one implementation of the invention.

Without loss of generality, with reference to FIG. 5, we take the case of a coding of a frame T51 by TDAC (windowed by $h_{51}$) followed by a frame T52 under AMR WB and then by a frame T53 again under TDAC (windowed by $h_{53}$).

In order to reconstruct the samples, the AMR WB coding is based on a prediction of the periodicity of the signal, so-called long-term prediction. In this respect, it constructs its samples in the following manner:

$$r_n=a\cdot r_{n-T}+b\cdot w_n.$$

The signal r is constructed with respect to former samples taken upstream of T samples weighted by a gain a, transmitted and updated periodically, and a so-called stochastic part $w_n$ assigned a gain b, transmitted and updated over time likewise. T represents the "pitch". The AMR WB coder estimates the components a, b and T and the part $w_n$ to be added in accordance with the throughput considered.

Thus, to carry out the long-term prediction effectively, the CELP decoder calls upon past samples that should not exhibit artifacts. Now, because frame T51 is coded under TDAC, there will be some aliasing in the samples between $M+(M-M_o)/2$ and $M+(M+M_0)/2$ as long as frame T52 is not restored with the aliasing making it possible to eliminate that of frame T51.

In order to allow the restoration of the samples of frame T52 coded under CELP without aliasing, the zone of coverage of the samples transmitted by this coding is widened to cover the initial transition zone completely.

The duration of the CELP is extended to the content of index M+(M−Mo)/2 . . . 5M/2.

In this sense, there is no critical sampling for the part coded by the predictive coding.

On the other hand the zone $M_o$ is limited in duration so as to avoid transmitting too much additional information.

For example, $M_o$ is situated around 1 to 2 ms for a frame of duration M corresponding to 20 ms. The number of samples is calculated as a function of the sampling frequency. It is also possible to choose Mo/2 as being a duration proportional to a CELP sub-frame, that is to say the customary duration of updating of the values of pitch/gain and stochastic vector, or a size suited to fast algorithms for searching for the stochastic vector and its transmission in an effective manner. For example, a power of 2 is taken.

To reconstruct the samples of the zone between M and 2M−1, the period between M and (M-Mo)/2 is reconstructed previously by using the inverse transform of a frame T50 (not represented) preceding frame T51. Thereafter the zone between M+(M−Mo)/2 and M−1 is reconstructed with the CELP alone which is based for the long-term part on the samples restored by the transformed part.

A variant for obtaining the samples lying between M+(M−Mo)/2 and M+(M+Mo)/2−1 consists in combining the CELP samples with the samples containing aliasing arising from frame T51. It is in this case possible to carry out a linear combination of the samples arising from the CELP and of the equation determined previously $$x_{3M/2-1-n}=\frac{1}{h_{a0,3M/2-1-n}}\left[\frac{\tilde{x}_{0,3M/2+n}}{h_{s0,3M/2+n}}-h_{a0,3M/2+n}x_{3M/2+n}\right].$$

The linear combination operates according to the model hereinbelow:

$$x_{3M/2-1-n} = \alpha_n \underbrace{x_{3M/2-1-n}}_{arising\ from\ the\ celp} + (1-\alpha_n) \underbrace{x_{3M/2-1-n}}_{arising\ from\ the\ transform}.$$

With $\alpha_n$ a set of positive or zero coefficients that are less than or equal to one.

The portion 2M, . . . 3M−1 is decoded using the end of the CELP samples transmitted between the indices 2M to 5M/2. Thereafter, based on this decoded result, the samples arising from the following transform are reconstructed in the overlap zone, which contains aliasing in a similar manner to the zone of overlap between frames T51 and T52. The difference with the other sense of transition resides in the fact that the CELP will not provide all the samples of the zone of transition of the transform, but only half (i.e. M'o/2=M/8 in our example for a size of transition of M'o=M/4). However, only half of this transition zone is necessary in order to be able to cancel the temporal aliasing of the transform.

The window $h_{51}$ may be asymmetric. Thus, the zone of overlap between the CELP and TDAC part, denoted $M_o'$, may be different from $M_o$.

Transmission of the CELP

Several alternatives for transmitting the CELP frame are described hereinafter.

In one implementation, the CELP frame covers a duration equal to the size M+Mo/2 as presented in FIG. 4. In accordance with the AMR WB standard, this frame is cut up into sub-segments, of size denoted by Mc in FIG. 5, allowing frequent updating of the parameters making it possible to synthesize a CELP signal of quality.

Thus the values of pitch, gain and the stochastic part are initially transmitted and optionally updated.

The length of the first sub-segment (Mc'), immediately following the transform, may be different if one wishes to use an arbitrary length Mo' with a standardized CELP coder with Mc imposed by this standard.

The pitch may be estimated on the part which is decoded before the sample of index M+(M−Mo)/2. Thus, it is possible to avoid transmitting the initial pitch, only the gain in pitch which is estimated in accordance with the common scheme exhibited in the AMR WB recommendation is transmitted.

In a variant of this implementation, the pitch gain is not transmitted. It is estimated on the signal decoded in the transformed part.

In an alternative implementation, the pitch estimation may be performed by including the period M+(M−Mo)/2 to M+(M+Mo)/2 which contains aliased components.

The stochastic part is transmitted as preamble, or ignored. This is so, in particular, if it is considered negligible on account of its low power, or if during the reconstruction, the version using the weighting $\alpha_n$ is used as a basis.

Indeed, a stochastic part is implicitly present in the signal arising from the aliased components coming from the transformed part.

The part of duration Mo/2 covered by the CELP may therefore be a specialized part, in the sense that it may benefit from the information arising from the complete decoding of the part arising from the previous transform.

Mo/2 may be equal to Mc if a particular compatibility with an existing coder is sought. For example, within the framework of an implementation including a CELP of AMR WB type, it is possible to choose Mo/2=Mc=5 ms.

Figure 6:
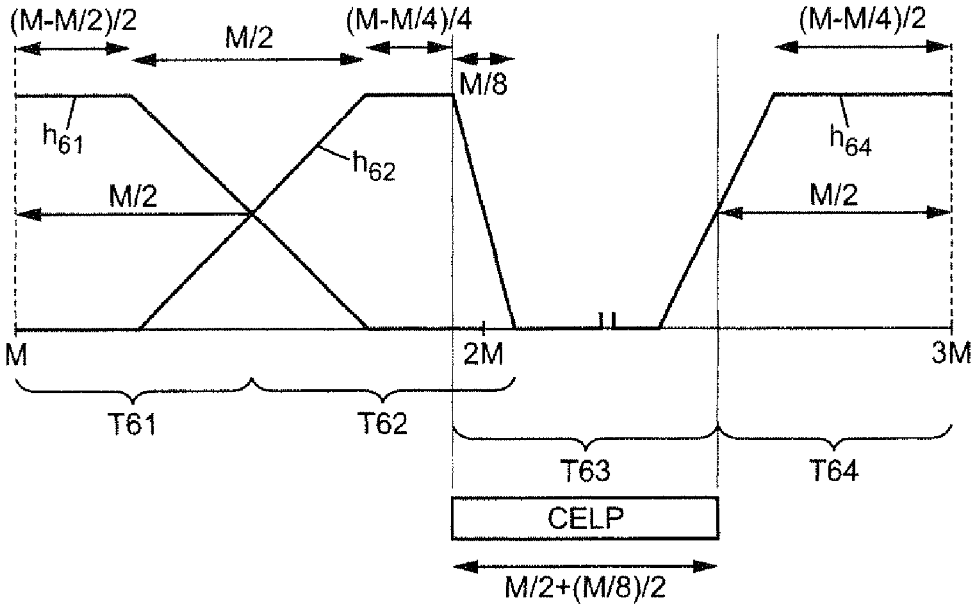
FIG. 6 illustrates the same case of coding with an advantageous asymmetric window.

An alternative implementation is presented in FIG. 6. In this implementation, the CELP coding covers a shorter length than the base frame of length M. The part covered by the samples M+(M−M/2)/2 to 2M+M/16 is encoded with the help of a transform of a shorter size than the initial size (M/2).

In FIG. 6, only frame T63 is coded under CELP. Frames T61, T62 and T64 are represented in the transformed domain of the TDAC. Frames T61 and T64 are coded with transforms of length M (windows $h_{61}$ and $h_{64}$), frame T62 being coded with a transform of size M/2 (window $h_{62}$).

This coding is effective since the window $h_{61}$ is relatively gentle, thereby making it possible to obtain a better concentration of energy in the frequency domain. On the other hand the window $h_{62}$ possesses a steeper transition in the neighborhood of the sample 2M, but this abrupt window does not overly penalize the quality of the coding because temporally the duration assigned is short. T63 is coded under CELP as presented above, here Mo=M/8.

Thus a frame of length M may be subdivided into sub-parts coded under CELP or TDAC of variable size.

Once the samples have been restored in the temporal domain, it is optionally possible to apply LPC synthesis filters to restore the sound signal if appropriate.

In a particular implementation, the transform is operated in a weighted domain, that is to say the transform is carried out on the signal filtered by a weighting filter of type $W(z)=A(z/\gamma_1)H_{de\text{-}emph}(z)$ with A(z) the linear prediction filter (LPC) and gamma a flattening factor for this filter, the filter $H_{de\text{-}emph}(z)$ is a filter for de-emphasizing the high frequencies. The CELP coder itself operates, that is to say the excitation signal $r_n$ will indeed be calculated in the residual domain of a linear prediction filter A(z). Particular attention will be paid to ensuring that the signal synthesized by the first inverse transform, and which is therefore in a perceptively weighted domain, is put back into the domain of the excitation of the CELP, so that the long-term part of the excitation of the CELP can be calculated.

An implementation of the coding method is described hereinafter.

Figure 7:
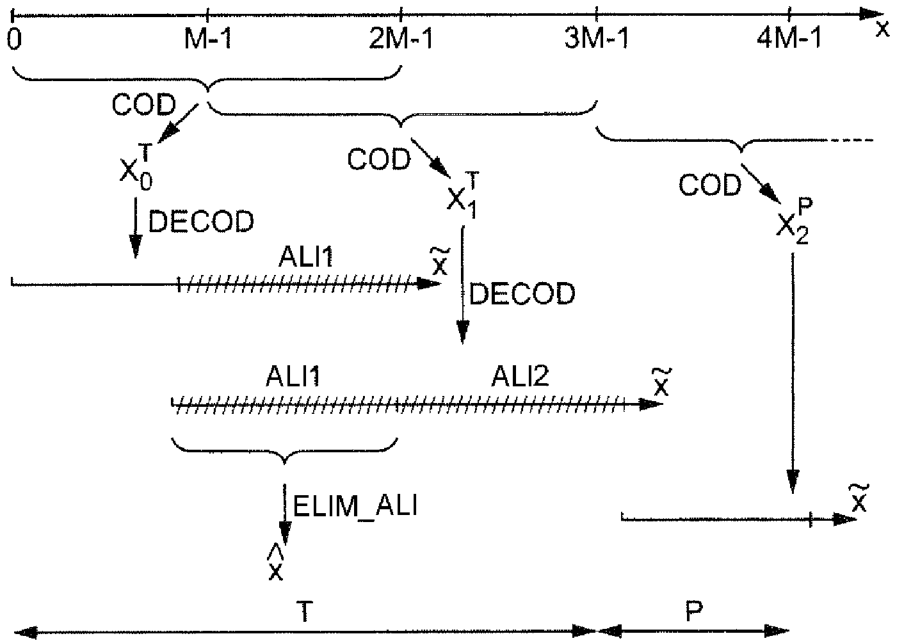
FIG. 7 illustrates a general context of a problem solved by the invention.

With reference to FIG. 7, the problem of switching between a coding of transform type with a coding of predictive type is illustrated.

A signal x to be coded and then decoded is considered. It is considered that the samples from 0 to 3M−1 must be transform coded, while the samples from 3M to 4M−1 must be coded by predictive coding, as indicated by the double arrows T and P.

According to the prior art, the samples from 0 to 2M−1 are transform coded coding according to a transform vector $X_0^T$.

The decoding of this transform vector gives the samples from 0 to 2M−1 of a decoded signal $\tilde{x}$. This decoding causes the appearance of some aliasing ALI1, in particular in the samples from M to 2M−1.

Moreover, the samples from M to 3M−1 are transform coded coding according to a transform vector $X_1^T$.

The decoding of this transform vector gives the samples from M to 3M−1 of the decoded signal $\tilde{x}$. This decoding causes the appearance of the same aliasing with an opposite sign to ALI1 in the samples from M to 2M−1 as during the decoding of $X_0^T$. It also causes the appearance of aliasing ALI2 in the samples from 2M to 3M−1 in $\tilde{x}$.

Thus, by combining the samples from M to 2M−1 arising respectively from the decoding of $X_0^T$ and $X_1^T$ it is possible to eliminate (ELIM_ALI) the aliasing ALI1.

The samples of x from 3M to 4M−1 are thereafter coded by predictive coding according to the prediction vector $X_2^P$.

To be decoded, this vector requires the knowledge of the previous samples. That is to say the samples from 2M to 3M−1. These samples are available on decoding $X_1^T$, nonetheless they are unusable on account of the presence of the aliasing ALI2.

Thus, $X_2^P$ may not be decoded.

Moreover, the elimination of the aliasing ALI2 requires the knowledge of the samples of x from 2M to 3M−1 to recreate the aliasing and eliminate it by combination. Now, these samples are not available on decoding.

Thus, the decoding of $X_1^T$ is not terminated.

To resolve these difficulties, the prior art proposes that the samples which it requires be communicated to the decoder in addition to the vectors arising from the transform and the prediction part. Nonetheless, this solution is not optimal from the throughput point of view.

Figure 8:
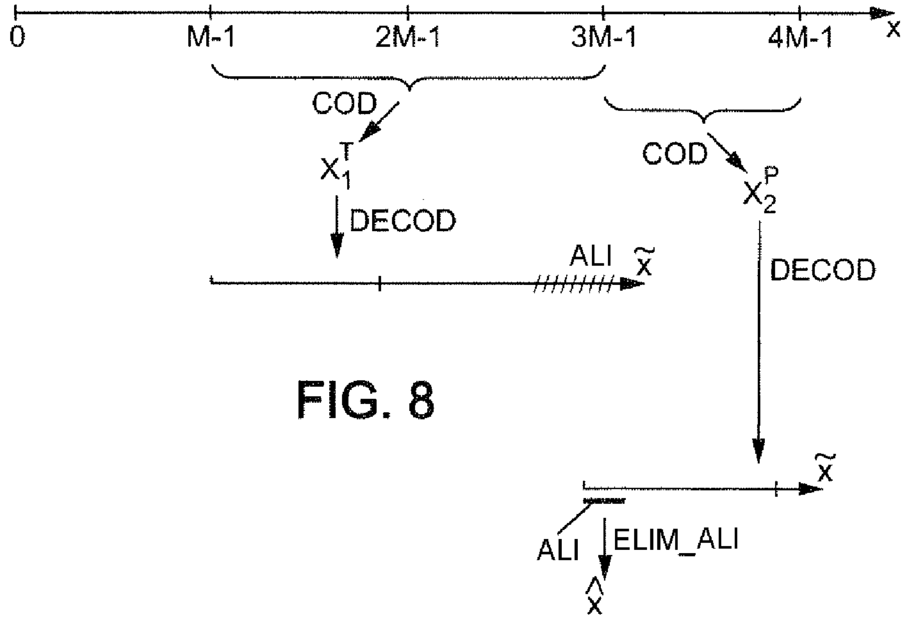
FIG. 8 illustrates a general diagram for solving this problem by the present invention.

The present invention proposes the solution illustrated in FIG. 8.

Depicted in this figure are the signal x, the transform vector $X_1^T$, and the prediction vector $X_2^P$.

However, according to the present invention, the prediction vector $X_2^P$ codes a number M of samples comprising a part of the samples coded by $X_1^T$.

This provision makes it possible to reconstruct the signal x upon decoding.

Indeed, the samples preceding the aliasing ALI created on decoding $X_1^T$ are used for decoding the first samples that the decoding of $X_2^P$ will make it possible to obtain. That is to say, those that it has in common with $X_1^T$.

Thus, samples of x making it possible to recreate the aliasing ALI are recovered. For example, the samples of x corresponding to ALI are made to undergo a coding followed by a decoding identical to those undergone by the samples from M to 3M−1.

This aliasing thus created is combined with that present in the samples arising from the decoding of $X_1^T$, and $X_1^T$ can thus be completely decoded.

Thereafter, it is possible to use the completely decoded samples from M to 3M−1 to decode $X_2^P$.

Figure 9:
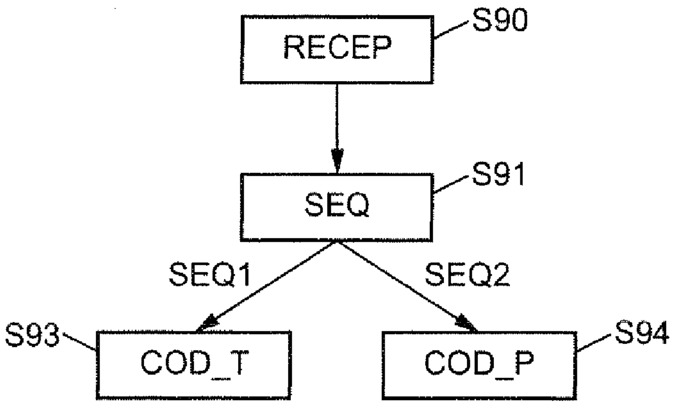
FIG. 9 illustrates the steps of an implementation of a coding method according to the invention.

Hereinafter, with reference to FIG. 9, a coding method employing the principles described hereinabove is described.

In step S90 samples of a signal to be coded are received. Thereafter, in step S91, two sequences of samples are delimited, so that the second sequence begins before the end of the first sequence. A first sequence SEQ1 and a second sequence SEQ2 are thus obtained.

Each of these sequences is thereafter coded according to a transform coding during step S93 for SEQ1, and according to a predictive coding during step S94 for SEQ2.

Figure 10:
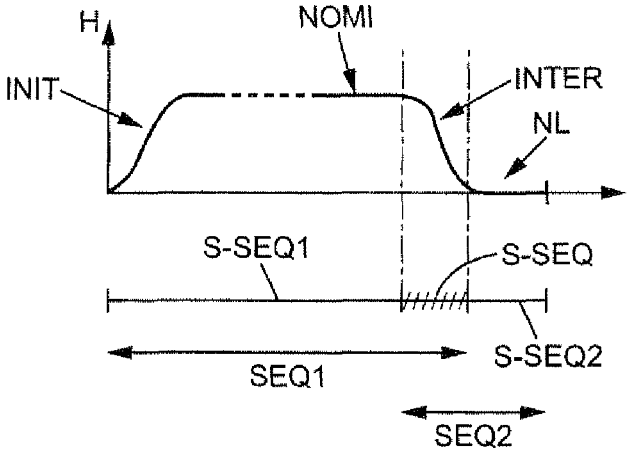
FIG. 10 illustrates the composition of a synthesis window according to one implementation of the invention.

Described with reference to FIG. 10 is an implementation in which the transform coding is done by applying an analysis window, making it possible to determine a synthesis window, by means of a perfect reconstruction relation, suited to the present coding.

The analysis and synthesis windows being related by the perfect reconstruction relation, it is equivalent to describe one or the other.

In FIG. 10, the synthesis window H is described. This window comprises four particular parts.

INIT corresponds to the initial part of the filter, this part is chosen as a function of the coding of the previous samples. For example, here, H makes it possible to reconstitute a part of SEQ1 (samples 0 to M−1). If the samples preceding SEQ1 are transform coded, INIT is advantageously chosen as a gentle transition. It is thereby possible to avoid disturbing these previous samples.

NOMI corresponds to a nominal part. Advantageously, this part takes a substantially constant value.

NL corresponds to a substantially zero part of the window. The duration of NL (or the number of coefficients of NL) can advantageously be chosen as a function of the duration (or number of coefficients) of NOMI.

Finally, the part INTER is a continuous part between NOMI and NL. This part can have a form suited to the transition between the transform coding of SEQ1 and the predictive coding of SEQ2. For example, it is a relatively abrupt transition.

Thus, INIT and NOMI are applied to the sub-sequence S-SEQ1 of SEQ1 which does not comprise any sample of S-SEQ, the sub-sequence common to SEQ1 and SEQ2. INTER is applied to S-SEQ. And NL is applied to S-SEQ2, the sub-sequence of SEQ2 which does not comprise any sample of S-SEQ.

Figure 11:
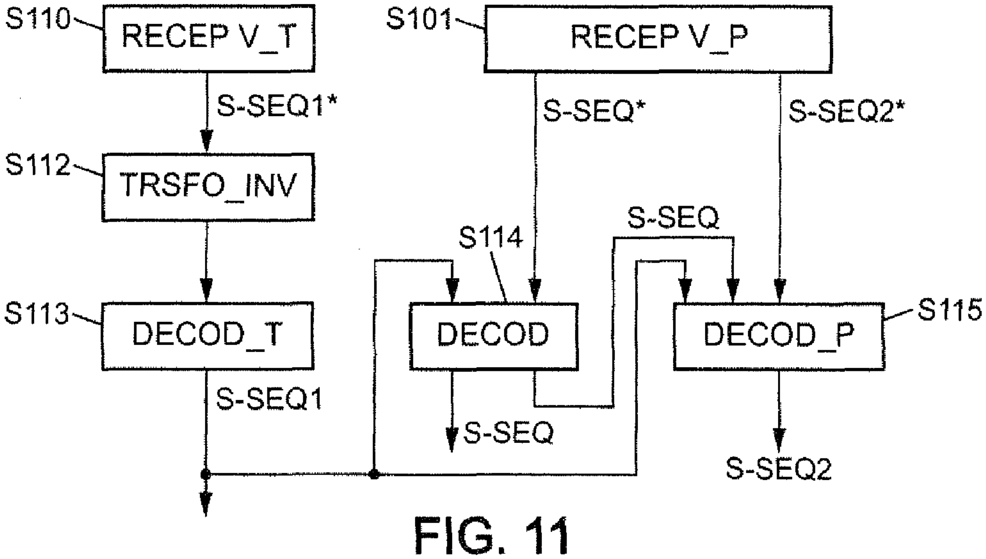
FIG. 11 illustrates the steps of an implementation of a decoding method according to the present invention.

With reference to FIG. 11, an advantageous decoding method for decoding a digital signal according to the principles described hereinabove is described.

In steps S110 and S111, a transform vector comprising samples S-SEQ1* coding S-SEQ1, and a prediction vector comprising samples S-SEQ* coding S-SEQ and samples S-SEQ2* coding S-SEQ2 are respectively received.

In step S112, an inverse transform is applied to the samples S-SEQ1*. For example, this entails a window of the type of H. For example, it is furthermore possible to provide a step S113 comprising additional decoding operations to obtain S-SEQ1.

In step S114, S-SEQ1 decoded by step S113, and S-SEQ* are received. S-SEQ is decoded, at least by predictive decoding, in step S114.

Finally, in step S115, S-SEQ decoded during step S114 and S-SEQ2* are received and then S-SEQ2 is decoded by predictive decoding. If required, it is also possible to bring in S-SEQ1 decoded in step S113.

Figure 12:
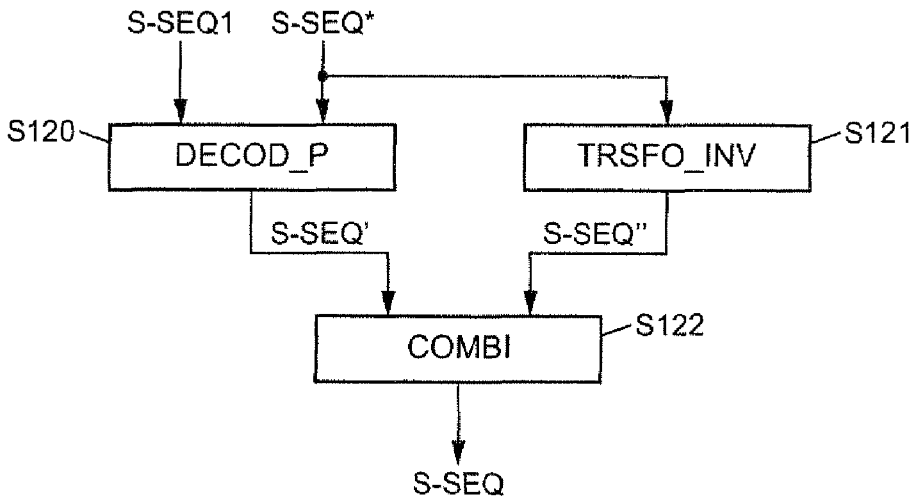
FIG. 12 illustrates an advantageous decoding used in the decoding method.

A mode of implementation of step S114 is described with reference to FIG. 12.

In this mode of implementation, a transform decoding and a predictive decoding are brought in at one and the same time.

In step S120, S-SEQ1 (arising from S114) and S-SEQ* are received, and then S-SEQ is decoded by predictive decoding. S-SEQ' is obtained.

In step S121, an inverse transform (for example that already applied to S-SEQ1* to obtain S-SEQ1) is applied to S-SEQ1*. S-SEQ" is obtained.

Finally, in step S122, a linear combination of the samples S-SEQ' and S-SEQ" is carried out to obtain S-SEQ.

Figure 13:
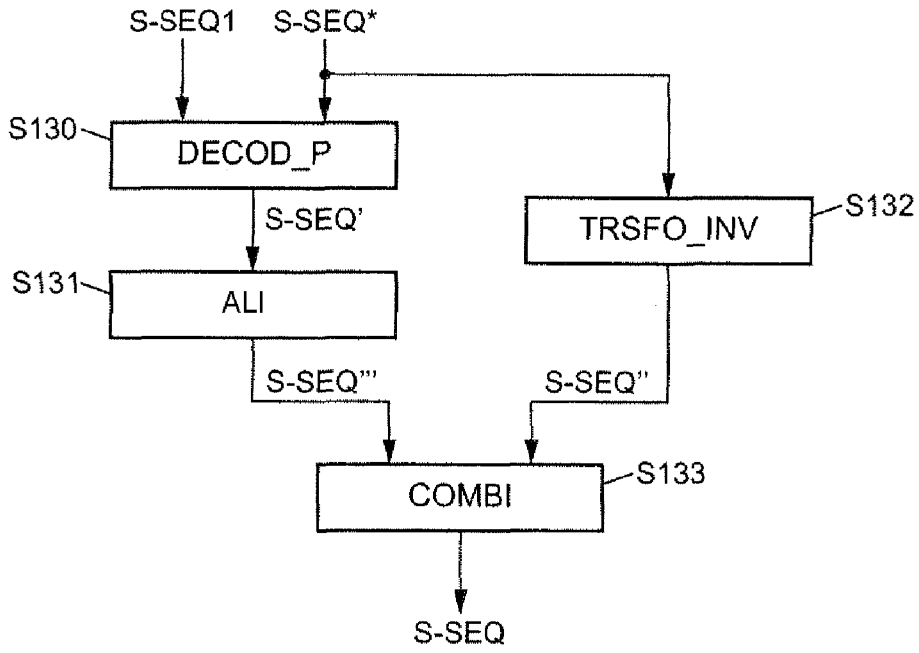
FIG. 13 illustrates a variant of this advantageous decoding.

With reference to FIG. 13, another mode of implementation of step S114 is described.

In this mode of implementation, the aliasing of opposite sign generated by the transform decoding of S-SEQ* (S-SEQ") is recreated on the basis of S-SEQ* decoded by predictive decoding.

Thus, in this mode of implementation S-SEQ1 and S-SEQ* are received in step S130 and then S-SEQ is decoded. S-SEQ' is obtained.

Thereafter, during step S131, the same aliasing is created as S-SEQ" in S-SEQ'. For this purpose the matrix S described hereinabove is applied thereto.

S-SEQ" corresponds to the transform decoding of S-SEQ* during step S132.

Finally, S-SEQ'" and S-SEQ" are combined during step S133 to obtain S-SEQ.

Figure 14:
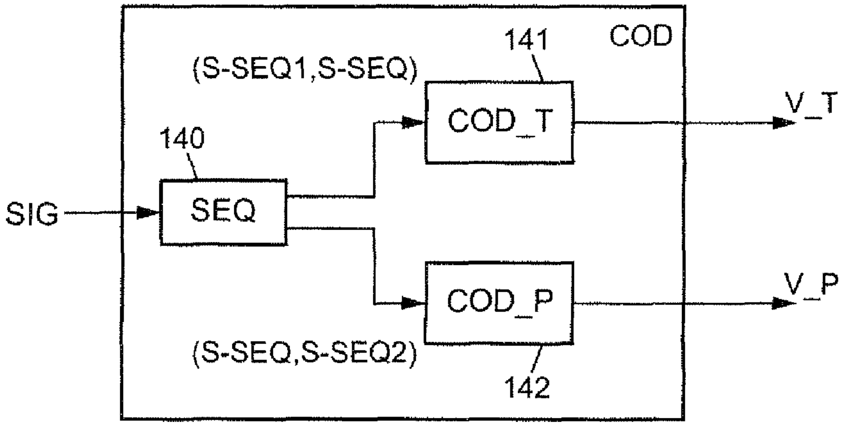
FIG. 14 illustrates a coder according to one implementation of the invention.

With reference to FIG. 14, a coding entity COD adapted for implementing the coding method described hereinabove is described.

This coding entity comprises a processing unit 140 adapted for receiving a digital signal SIG and determining two sequences of samples: a first sequence comprising a sub-sequence S-SEQ common to the two sequences, and a sub-sequence S-SEQ1, and a second sequence which begins before the end of the first sequence and which contains S-SEQ and a sub-sequence S-SEQ2.

The coding entity also comprises a transform coder 141, and a predictive coder 142. These coders are adapted for implementing the steps of the coding method described hereinabove, and respectively delivering a transform vector V_T coding the first sequence and a prediction vector V_P coding the second sequence.

Communication means (non-represented) may be provided for exchanging signals between the coders.

Figure 15:
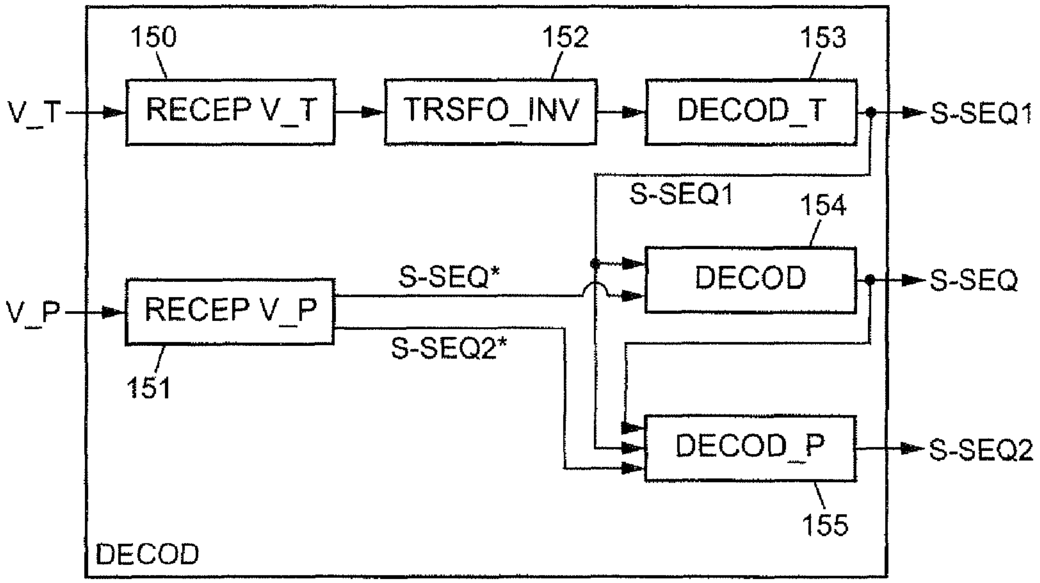
FIG. 15 illustrates a decoder according to one implementation of the invention.

With reference to FIG. 15, a decoding entity for implementing the decoding method described hereinabove is described.

This decoding entity DECOD comprises reception units 150 and 151 for receiving respectively a transform vector V_T comprising samples S-SEQ1* coding S-SEQ1, and a prediction vector V_P comprising samples S-SEQ* coding S-SEQ and samples S-SEQ2* coding S-SEQ2.

The unit 150 provides S-SEQ1* to an inverse transform application unit 152. Furthermore, provision may for example be made for the unit 152 to provide a result to a transform decoding unit 153 so as to carry out additional decoding operations and provide S-SEQ1.

Once decoded by the unit 153, the decoding unit 154 receives S-SEQ1 decoded by the unit 153, and S-SEQ* provided by the unit 151. The unit 154 decodes, at least by predictive decoding S-SEQ, and provides S-SEQ.

Finally, DECOD comprises a predictive decoding unit 155 for receiving S-SEQ provided by the unit 154, and S-SEQ2* provided by the unit 151, and then for decoding S-SEQ2 by predictive decoding and providing S-SEQ2. If required, the unit 153 also provides S-SEQ1 decoded previously by the unit 153.

A computer program for comprising instructions for implementing the coding method described hereinabove could be established according to a general algorithm described by FIG. 9.

This computer program could be executed in a processor of a coding entity such as described hereinabove, to code a signal with at least the same advantages as those afforded by the coding method.

In the same manner, a computer program for comprising instructions for implementing the decoding method described hereinabove could be established according to a general algorithm described by FIG. 11.

This computer program could be executed in a processor of a decoding entity such as described hereinabove, to decode a signal with at least the same advantages as those afforded by the decoding method.

Figure 16:
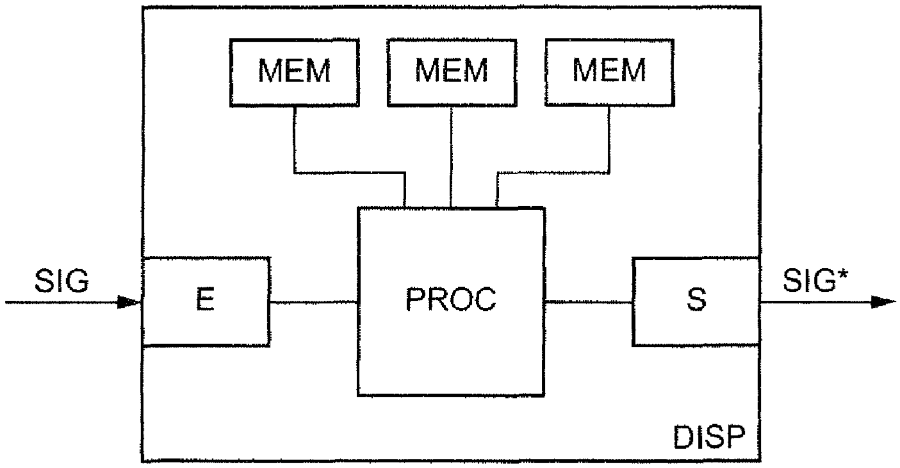
FIG. 16 illustrates a hardware device adapted for implementing a coder or a decoder according to one mode of implementation of the present invention.

With reference to FIG. 16, a hardware device adapted for implementing a coder or a decoder according to one mode of implementation of the present invention is described.

This device DISP comprises an input E for receiving a digital signal SIG. The device also comprises a digital signals processor PROC adapted for carrying out coding/decoding operations in particular on a signal originating from the input E. This processor is linked to one or more memory units MEM adapted for storing information necessary for driving the device in respect of coding/decoding. For example, these memory units comprise instructions for implementing the coding/decoding method described hereinabove. These memory units can also comprise calculation parameters or of other information. The processor is also adapted for storing results in these memory units. Finally, the device comprises an output S linked to the processor for providing an output signal SIG*.

Of course, it is advantageously possible to combine one or more characteristics described hereinabove.

The invention claimed is:

1. A method for coding a digital audio signal, said method being performed by a coding entity comprising a processing unit, a transform coder and a predictive coder, comprising the steps of:

receiving a digital audio signal by the processing unit and determining a first and a second sequence of samples of the digital audio signal;

coding, by the transform coder, of the first sequence of samples according to a transform coding;

coding, by the predictive coder, of the second sequence of samples according to a predictive coding;

wherein the second sequence begins before the end of the first sequence, a sub-sequence of samples being common to the first and second sequences, the sub-sequence being coded at the same time by predictive coding and by transform coding.

2. The method as claimed in claim 1, wherein the transform coding of the first sequence comprises:

applying an analysis window making it possible to deduce from a perfect reconstruction relation for the digital audio signal a synthesis window comprising at least three parts:

a first nominal part, a second substantially zero terminal part, and a third continuous intermediate part between the first and second parts, wherein at least parts of the analysis window making it possible to deduce respectively said second and third parts of the synthesis window are applied to the sub-sequence of samples common to the two first and second sequences.

3. The method as claimed in claim 1, wherein the transform coding is a critical sampling coding.

4. The method as claimed in claim 2, wherein the synthesis window further comprises a fourth part of a smooth transition between an initial value and a value of the nominal part, and the third part is an abrupt transition between a value of the nominal part and a value of the substantially zero part.

5. The method as claimed in claim 1, wherein the first and second sequences belong to one and the same frame of the digital audio signal.

6. A method for decoding a digital audio signal, said method being performed by a decoding entity comprising first and second reception units, an inverse transform application unit, a transform decoding unit, a decoding unit and a predictive decoding unit, comprising the steps of:

receiving, by the first reception unit, of a transform vector coding a first sequence of samples of the digital audio signal according to a transform coding;

receiving, by the second reception unit, a prediction vector coding a second sequence of samples of the digital audio signal according to a predictive coding;

wherein the second sequence begins before the end of the first sequence, a sub-sequence of samples being common to the first and second sequences, the sub-sequence being received coded at the same time by predictive coding and by transform coding; and wherein the method further comprises the steps of:

a) applying to the transform vector, by an inverse transform application unit, a transform inverse to the transform coding to decode a sub-sequence of samples of the first sequence not coded by predictive coding;

b) decoding at least in the prediction vector, by the decoding unit, the sub-sequence of samples common to the first and second sequences at least by a predictive decoding, based on at least one sample arising from step a); and c) decoding in the predictive vector by the predictive decoding unit a sub-sequence of samples of the second sequence not coded by transform coding, based on at least one sample arising from one of steps a) and b).

7. The method as claimed in claim 6, wherein step b) comprises the sub-steps of:

b1) decoding in the predictive vector the sub-sequence of samples common to the first and second sequences by a predictive decoding, based on at least one sample arising from step a);

b2) applying to the transform vector a transform inverse to the transform coding to decode the sub-sequence of samples common to the first and second sequences; and b3) decoding the sub-sequence of samples common to the first and second sequences by combining at least one sample arising from step b1) with a corresponding sample arising from step b2).

8. The method as claimed in claim 6, wherein step b) comprises the sub-steps of:

b4) decoding in the predictive vector the sub-sequence of samples common to the first and second sequences by a predictive decoding, based on at least one sample arising from step a);

b5) creating on a basis of at least one sample arising from step b4) a sample containing an aliasing equivalent to a transform coding followed by a transform decoding;

b6) applying to the transform vector a transform inverse to the transform coding to decode the sub-sequence of samples common to the first and second sequences; and b7) decoding the sub-sequence of samples common to the first and second sequences by combining at least one sample arising from step b5) with a corresponding sample arising from step b6).

9. The method as claimed in claim 6, wherein step a) comprises:

applying a synthesis window comprising at least three parts:

a first nominal part, a second substantially zero terminal part, a third continuous intermediate part between the first and second zones, and wherein at least the second and third parts of the synthesis window are applied to the sub-sequence of samples common to the first and second sequences.

10. A non-transitory computer program product comprising instructions for the implementation of the method as claimed in claim 1 when the program is executed by a processor.

11. A non-transitory computer program product comprising instructions for the implementation of the method as claimed in claim 6 when the program is executed by a processor.

12. A coding entity for a digital audio signal, comprising:

a processing unit for receiving a digital audio signal and determining a first and a second sequence of samples of the digital audio signal;

a transform coder for coding the first sequence of samples according to a transform coding; and a predictive coder for coding the second sequence of samples according to a predictive coding;

wherein the second sequence begins before the end of the first sequence, a sub-sequence of samples being common to the first and second sequences, the sub-sequence being coded at the same time by predictive coding and by transform coding.

13. A decoding entity for a digital audio signal, comprising:

a first reception unit for receiving a transform vector coding a first sequence of samples of the digital audio signal according to a transform coding; and a second reception unit for receiving a prediction vector coding a second sequence of samples of the digital audio signal according to a predictive coding;

wherein the second sequence begins before the end of the first sequence, a sub-sequence of samples being common to the first and second sequences, the sub-sequence being coded at the same time by predictive coding and by transform coding; and wherein the decoding entity further comprises:

a first decoder for applying to the transform vector a transform inverse to the transform coding to decode a sub-sequence of samples of the first sequence not coded by predictive coding;

a second decoder for decoding at least in the predictive vector the sub-sequence of samples common to the first and second sequences at least by a predictive decoding, based on at least one sample arising from the first decoder; and a third predictive decoder for decoding in the predictive vector by a predictive decoding a sub-sequence of samples of the second sequence not coded by transform coding, based on at least one sample arising from one of the first and second decoders.

14. The decoding entity as claimed in claim 13, wherein the second decoder comprises:

first elements for decoding in the predictive vector the sub-sequence of samples common to the first and second sequences by a predictive decoding, based on at least one sample restored by the first decoder;

second elements for applying to the transform vector a transform inverse to the transform coding to decode the sub-sequence of samples common to the first and second sequences; and third elements for decoding the sub-sequence of samples common to the first and second sequences by combining at least one sample arising from the first elements with a corresponding sample arising from the second elements.

15. The decoding entity as claimed in claim 13, wherein the second decoder comprises:

first elements for decoding in the predictive vector the sub-sequence of samples common to the first and second sequences by a predictive decoding, based on at least one sample restored by the first decoder;

fourth elements for creating an aliasing on a basis of at least one sample arising from the first elements equivalent to a transform coding followed by a transform decoding;

fifth elements for applying to the transform vector a transform inverse to the transform coding to decode the sub-sequence of samples common to the first and second sequences; and sixth elements for decoding the sub-sequence of samples common to the first and second sequences by combining at least one sample arising from the fourth elements with a corresponding sample arising from the fifth elements.

* * * * *